United States Patent [19]

Coffey

[11] Patent Number: 5,425,664
[45] Date of Patent: Jun. 20, 1995

[54] MAGNET PAINTER TOY

[76] Inventor: Judith A. Coffey, 23 Phillips Dr., Westford, Mass. 01886

[21] Appl. No.: 130,272

[22] Filed: Oct. 1, 1993

[51] Int. Cl.$^6$ ...................... A63H 33/26; G09B 11/10
[52] U.S. Cl. .................................. 446/135; 446/146; 434/84
[58] Field of Search ............... 446/135, 134, 133, 132, 446/136, 137, 138, 139, 146, 129; 401/5, 48; 434/84, 81, 85, 82

[56] References Cited

U.S. PATENT DOCUMENTS

| | | | |
|---|---|---|---|
| 1,945,065 | 1/1934 | Mösslang et al. | 421/48 |
| 2,036,076 | 3/1936 | Philippi | 446/134 X |
| 2,116,407 | 5/1938 | Nissly | 401/48 |
| 2,239,970 | 4/1941 | Osborne . | |
| 3,106,042 | 10/1963 | Roethler . | |
| 3,114,547 | 12/1963 | Joslyn | 446/135 X |
| 3,319,283 | 5/1967 | Delligatti | 401/5 |
| 3,510,949 | 5/1970 | Christy | 446/135 |
| 3,585,735 | 6/1971 | Miller . | |
| 3,597,099 | 8/1971 | Tollin | 434/84 X |
| 3,629,971 | 12/1971 | Antell et al. | 446/135 |
| 4,023,524 | 5/1977 | Goldfarb et al. | 118/301 |
| 4,369,579 | 1/1983 | Mizoule . | |
| 4,507,087 | 3/1985 | Stevenson | 40/406 X |
| 4,566,195 | 1/1986 | Kulesza et al. | 446/136 X |
| 4,893,583 | 1/1990 | Jaffe | 434/84 X |
| 5,217,378 | 6/1993 | Donovan | 434/84 X |

FOREIGN PATENT DOCUMENTS

| | | | |
|---|---|---|---|
| 619633 | 4/1927 | France | 446/135 |
| 951196 | 10/1949 | France | 446/135 |
| 569665 | 2/1933 | Germany . | |
| 137708 | 5/1934 | Germany | 446/135 |
| 2-41300 | 2/1990 | Japan . | |

OTHER PUBLICATIONS

C. Gould, Washington Post "Dick Tracy", p. B19, Jan. 8, 1963.

Primary Examiner—Robert A. Hafer
Assistant Examiner—D. Neal Muir
Attorney, Agent, or Firm—Wolf, Greenfield & Sacks

[57] ABSTRACT

A magnet painter toy includes a nonmagnetic plate for supporting a painting sheet on its upper surface, a magnet that is manually moved over the lower surface of the plate by a user, and a figure positioned on the painting sheet in registration with the magnet. One or more drops of paint are applied to the painting sheet. The figure is at least in part magnetic such that as the magnet is moved under the lower surface of the plate by the user, the figure moves through the drops of paint and produces a desired design on the painting sheet.

14 Claims, 2 Drawing Sheets

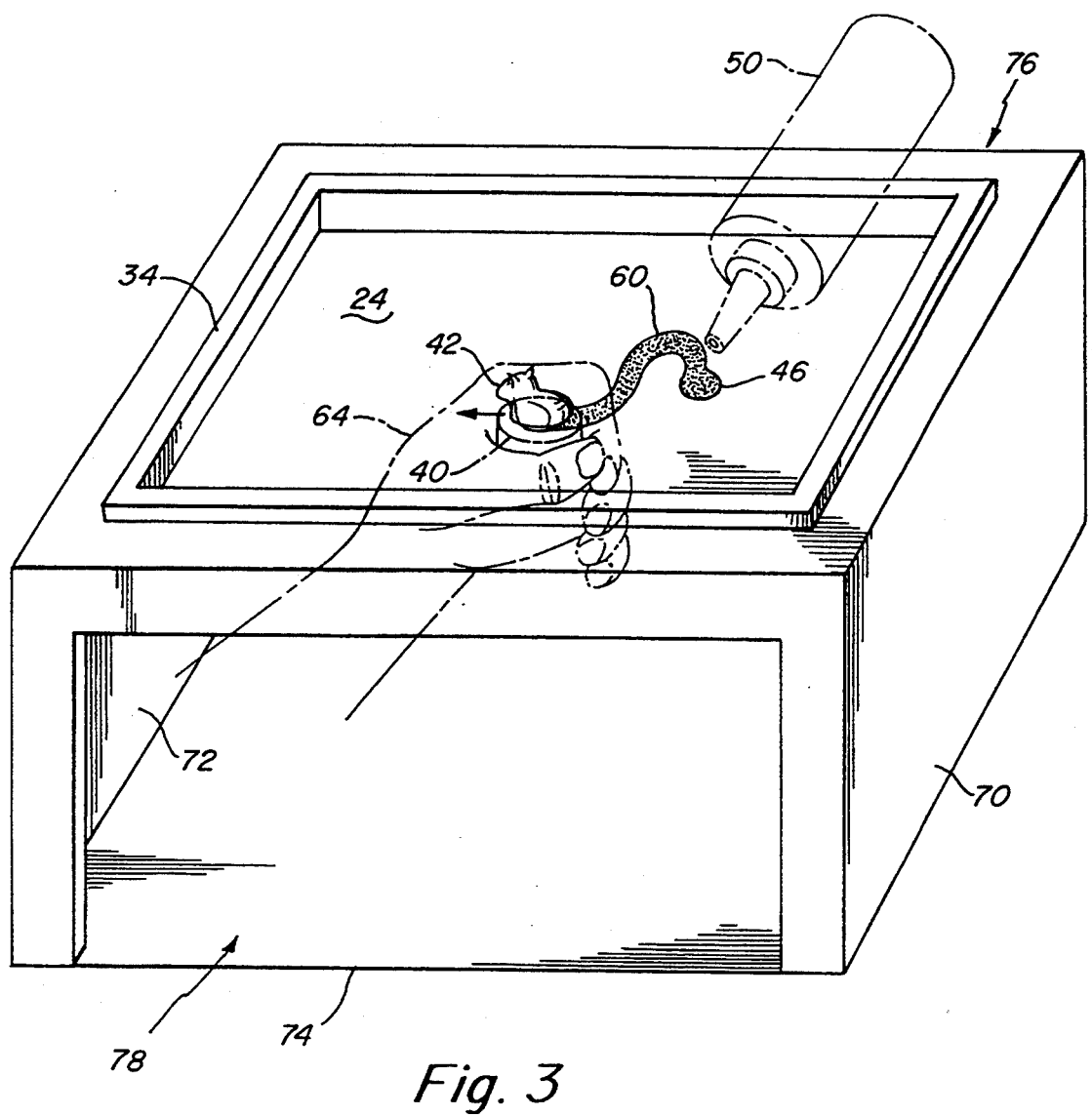
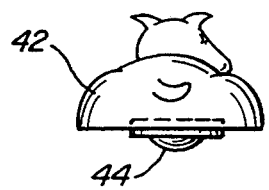
Fig. 3
Fig. 4

MAGNET PAINTER TOY

FIELD OF THE INVENTION

This invention relates to an amusement toy for young children and, more particularly, to a magnet painter toy wherein a magnet arrangement is used to create a desired pattern or design on a painting sheet.

BACKGROUND OF THE INVENTION

Various toys and devices have been disclosed in the prior art wherein a magnet or magnetic particles are used to produce a pattern on a paper.

U.S. Pat. No. 3,510,949 issued May 12, 1970 to Christy discloses a toy wherein a figure having a writing device is positioned on a paper. The figure has a magnet base which is attracted by quadrupole magnets located beneath a support surface. The magnets are driven by an arrangement of gears so that the figure writes a geometric pattern on the paper.

U.S. Pat. No. 3,106,042 issued Oct. 8, 1963 to Roethler discloses a toy wherein a layer of sand is positioned on a base plate. A magnet is moved below the base plate to cause various toy earth-working machines to move in the sand and to simulate earth-working operations.

U.S. Pat. No. 2,239,970 issued Apr. 29, 1941 to Osborne discloses a toy wherein particles of magnetic paint are distributed on a board by moving a magnet below the board.

U.S. Pat. No. 3,585,735 issued Jun. 22, 1971 to Miller discloses a box containing magnetic particles. A design is formed by moving a magnet over the surface of the box.

U.S. Pat. No. 4,369,579 issued Jan. 25, 1983 to Mizoule discloses a toy wherein a pencil holder is located on a flat box. A mechanical arrangement inside the box moves a magnet, causing the pencil holder to move over a paper positioned on the box.

Japanese Publication No. 2-41300 dated February 1990 discloses a system for drawing using a magnetic pigment and magnets for producing a magnetic field.

German Publication No. 569,665 dated January 1933 discloses a device wherein a figure is retained on a board by magnets.

SUMMARY OF THE INVENTION

According to one aspect of the invention, a painting toy comprises a nonmagnetic plate for supporting a painting sheet, a magnet that is manually moved under the lower surface of the plate by a user, and an object positioned on the painting sheet in registration with the magnet. One or more drops of paint are applied to the painting sheet. The object is at least in part magnetic such that as the magnet is moved under the lower surface of the plate by the user, the object moves over the painting sheet through the drops of paint and produces a desired design on the painting sheet. The painting sheet can be paper, cardboard, canvas, fiberboard or any other desired painting surface.

The object that moves over the painting sheet is preferably a decorative figure and may, for example, represent a person or an animal. The object may include a flat magnetic lower portion that contacts the painting sheet and produces the desired design as the object moves through the drops of paint.

The toy preferably further includes a structure, such as legs, for supporting the plate in a raised position to provide access to the lower surface of the plate. The plate may have a raised edge for limiting slippage of the painting sheet. In a preferred embodiment, the painting toy further includes a retainer comprising a peripheral ring for retaining the painting sheet on the upper surface of the plate. The retainer can be located within the raised edge of the plate so as to rest on the painting sheet.

According to another aspect of the invention, a method for painting comprises the steps of providing a nonmagnetic plate having upper and lower surfaces, positioning a painting sheet on the upper surface of the plate, applying one or more drops of paint to the painting sheet, positioning an object that is at least in part magnetic on the painting sheet, and positioning a magnet on or near the lower surface of the plate in registration with the object and manually moving the magnet under the lower surface such that the object moves over the painting sheet through the drops of paint and produces a desired design on the painting sheet.

According to a further aspect of the invention, a painting toy comprises means for supporting a painting sheet to which one or more drops of paint are applied, a magnet that is manually movable under the lower surface of the painting sheet by a user, and an object positioned on the painting sheet in registration with the magnet. The object is at least in part magnetic such that as the magnet is moved under the lower surface of the painting sheet by the user, the object moves over the painting sheet through the drops of paint and produces a desired design on the painting sheet.

BRIEF DESCRIPTION OF THE DRAWINGS

For a better understanding of the present invention, reference is made to the accompanying drawings, which are incorporated herein by reference and in which:

FIG. 3 is a perspective view of a magnet painter toy utilizing a box for support; and FIG. 4 illustrates a figure having a magnetic ball in its lower portion.

DETAILED DESCRIPTION

Figure 1:
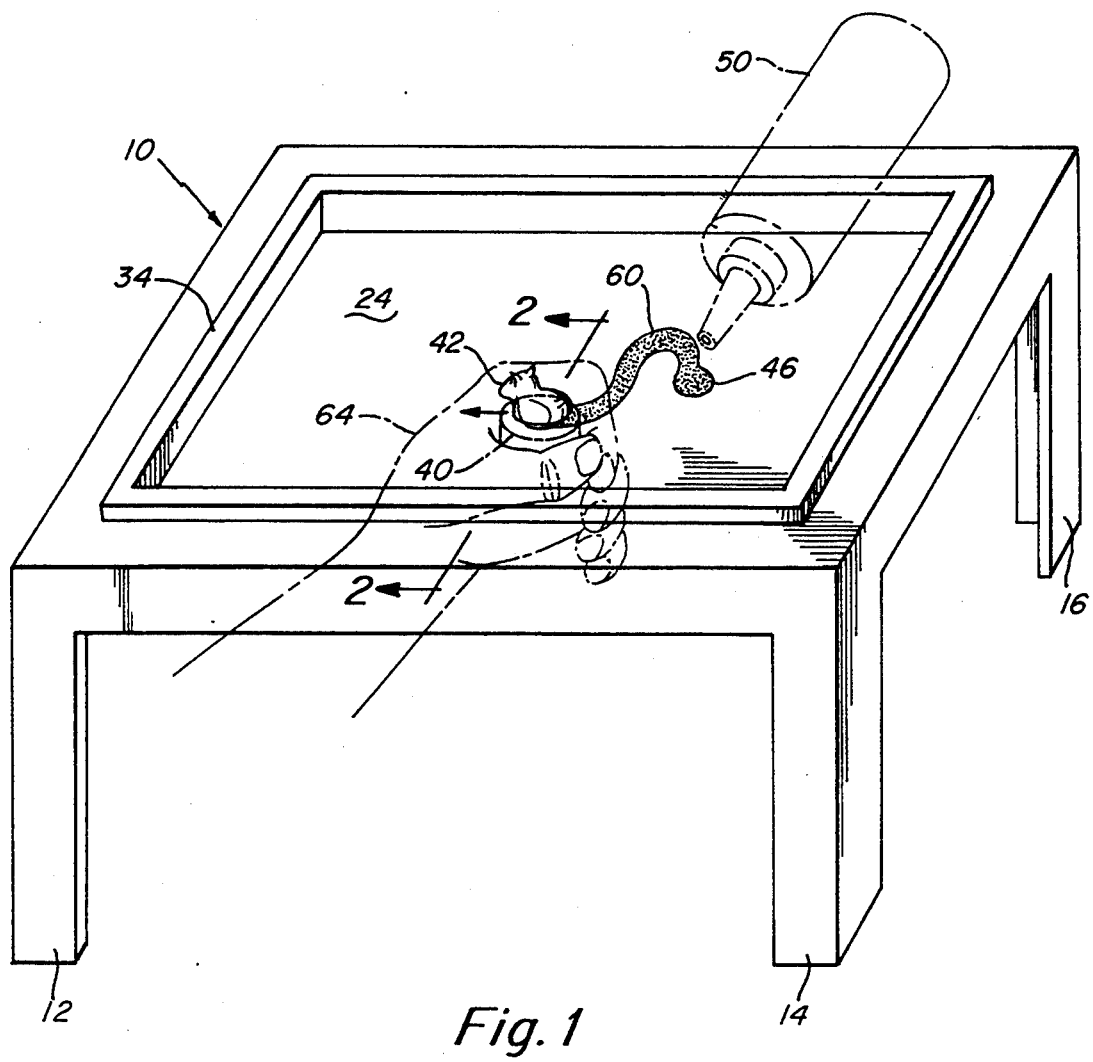
FIG. 1 is a perspective view of a magnet painter toy in accordance with the present invention.
Figure 2:
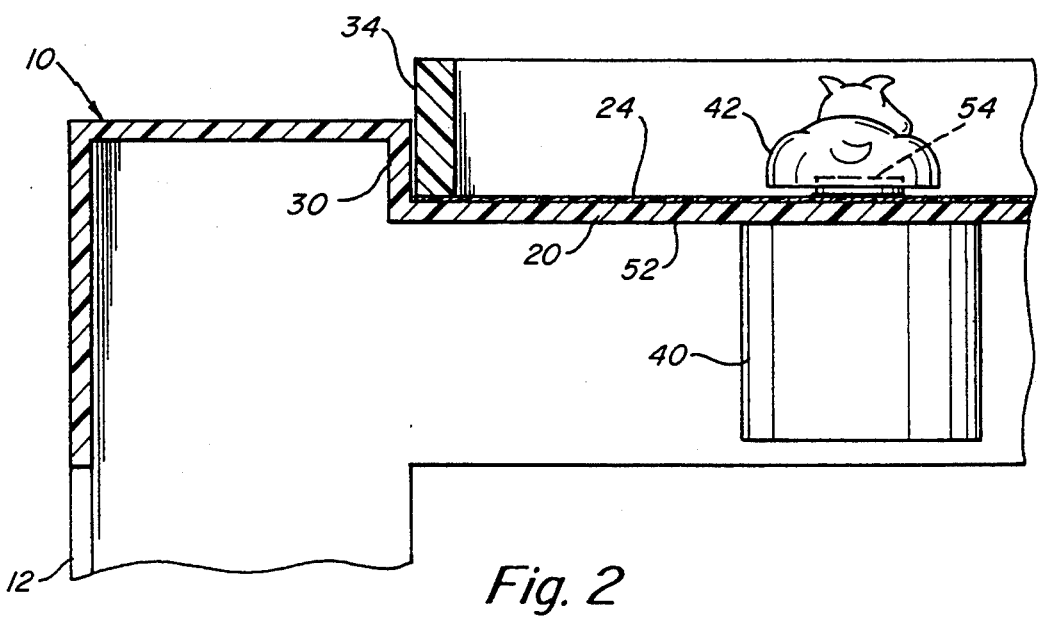
FIG. 2 is a partial cross-sectional view of the magnet painter toy taken along the line 2—2 of FIG. 1.

A magnet painter toy in accordance with the invention is shown in FIGS. 1 and 2. A support frame 10 including legs 12, 14 and 16 (and a fourth leg not visible in FIG. 1) supports a nonmagnetic plate 20 in a raised position above a table, counter, desk, or the like. The nonmagnetic plate 20 supports a painting sheet 24 such as writing paper, construction paper, posterboard, cardboard, canvas or the like, typically in a horizontal position. The nonmagnetic plate 20 can have a raised edge 30 around its periphery defined by a recess in support frame 10 for retaining the painting sheet 24 in a fixed position relative to plate 20 during painting as described below.

A retainer 34 can be used to further insure that the painting sheet 24 remains in position during painting. The retainer 34 can, for example, be a peripheral ring that is located inside the raised edge 30 and rests on painting sheet 24. Thus, the edges of painting sheet 24 are secured in a fixed position.

The support frame 10, plate 20, and retainer 34 can be fabricated, for example, of plastic. However, other materials, such as metal, wood, fiberboard and the like, can be used, provided that plate 20 beneath painting sheet 24 is fabricated of a nonmagnetic material.

A magnet 40 and an object such as a figure 42 are used to form a desired pattern or design of paint on the painting sheet 24. One or more drops 46 of paint are applied to the painting sheet 24 from a squeeze bottle 50 or any other suitable container. Preferably, the paint is somewhat thick to prevent running on the painting sheet 24. Drops of the same or different colors can be applied as desired.

Then the user, typically a young child, places the magnet 40 on or near the lower surface 52 of plate 20 in registration with figure 42. The figure 42 includes a magnetic portion 54 which is magnetically attracted to magnet 40. The user then moves the magnet 40 under the lower surface 52 of plate 20, causing the figure 42 to be moved by the magnetic attraction of magnet 40 over painting sheet 24. As the figure 42 moves through paint drop 46, the paint is spread over the painting sheet 24 to produce a desired pattern or design 60. The movement of magnet 40 and figure 42 can be regular or irregular, over all or part of the painting sheet 24.

Preferably, the figure 42 is decorative in appearance and may represent a person, an animal or any other desired object. Any shape is suitable. The only requirement is that the figure include a magnetic portion 54 that is attracted to magnet 40. The portion of figure 42 that contacts painting surface 24 can be flat for stability and can have a width that corresponds to a desired width of the lines in the pattern or design. In one variation, the figure 42 can contact painting sheet 24 in two or more areas. For example the figure 42 may have two or more legs that contact painting sheet 24. In another variation, shown in FIG. 4, the figure 42 can have a magnetic ball 44 or marble mounted in its lower portion. The magnetic ball 44 rolls over the surface of the painting sheet 24 as the magnet 40 is moved under plate 20.

The magnet painter toy can include figures of different sizes and shapes. For example, figures with different base sizes can be used to form different line widths. Also, larger figures may be used for younger children.

The legs 12, 14, and 16 of support frame 10 should have sufficient length to permit access of a user's hand 64 to the underside of plate 20 so as to permit unhindered movement of magnet 40. The support frame can have any desired configuration that permits such access. For example, as shown in FIG. 3, one or more sides 70 and 72, as well as the bottom 74, can be enclosed to form a box 76 having an opening 78 for access to the lower surface of the plate 20 (FIG. 2). The box 76 can be used as a container for the various parts of the magnet painter toy, such as the figure 42, magnet 40, painting sheets and containers of paint, when the toy is not in use. The plate 20 that supports the painting sheet can be square, rectangular, circular, oval or any other desired shape.

The embodiment of the magnet painter toy shown in FIGS. 1 and 2 includes raised edge 30 of the plate 20 and retainer 34 for insuring that the painting sheet 24 remains in a fixed position during painting. Preferably, the magnet painter toy includes some means for temporarily securing the painting sheet 24 in a fixed position relative to plate 20 during painting. Other suitable means include clips, clamps and an adhesive on the back of painting sheet 24 or on the upper surface of plate 20.

When a relatively rigid painting sheet 24 is used, a plate may not be required for support. In this case, the painting sheet 24 can be supported at its periphery. For example, the support frame can be provided with a lip or shelf for supporting the painting sheet around all or part of its periphery.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A painting toy comprising:
    a nonmagnetic plate having a lower surface and having an upper surface supporting a painting sheet having one or more drops of paint thereon during use;
    a structure supporting said plate in a raised position, said structure having legs allowing access to the lower surface of said plate, said structure and said plate maintaining said painting sheet in a horizontal position during use;
    a magnet that is manually movable under the lower surface of said plate by a user; and
    a decorated figurine positioned on the painting sheet in registration with said magnet, said decorated figurine being at least in part magnetic such that as said magnet is moved under said lower surface by the user, said decorated figurine is freely moved over said painting sheet through said drops of paint and produces a desired design of said paint on said painting sheet, said decorated figurine resting entirely on said painting sheet.

2. A painting toy as defined in claim 1 wherein said plate has a raised edge for limiting slippage of said painting sheet on the upper surface of said plate.

3. A painting toy as defined in claim 2 further including a retainer comprising a peripheral ring for retaining said painting sheet on the upper surface of said plate, said retainer being located within the raised edge of said plate and resting on said painting sheet.

4. A painting toy as defined in claim 1 further including a retainer comprising a peripheral ring for retaining said painting sheet on the upper surface of said plate.

5. A painting toy as defined in claim 1 further including means for retaining said painting sheet on the upper surface of said plate.

6. A painting toy as defined in claim 1 wherein said decorated figurine includes a flat magnetic lower portion that contacts said painting sheet and produces said desired design as said decorated figurine moves through said drops of paint.

7. A painting toy as defined in claim 1 wherein said decorated figurine includes a magnetic ball that contacts said painting sheet and produces said desired design as said decorated figurine moves through said drops of paint.

8. A painting toy comprising:
    a support frame supporting a painting sheet having a lower surface and an upper surface, said upper surface having one or more drops of paint thereon during use, said support frame supporting said painting sheet in a raised position while allowing user access to said lower surface and maintaining said painting sheet in an essentially horizontal position during use;

a magnet that is manually movable under the lower surface of the painting sheet by a user; and a decorated figurine positioned on the upper surface of the painting sheet in registration with said magnet, said decorated figurine being at least in part magnetic such that as said magnet is moved under said lower surface by the user, said decorated figurine is freely movable over said painting sheet through said drops of paint and produces a desired design of said paint on said painting sheet, said decorated figurine resting entirely on said painting sheet.

9. A painting toy as defined in claim 8 wherein said support frame comprises a nonmagnetic plate for supporting said painting sheet.

10. A painting toy as defined in claim 8 wherein said support frame includes a lip for supporting the painting sheet around all or part of its periphery.

11. A painting toy as defined in claim 8 wherein said support frame comprises legs for supporting said plate in the raised position.

12. A painting toy as defined in claim 8 wherein said support frame comprises a box for supporting said plate in the raised position, said box having at least one opening for access to the lower surface of said plate.

13. A method for painting comprising the steps of:
providing a nonmagnetic plate having upper and lower surfaces;

providing a structure maintaining said nonmagnetic plate in a horizontal position during use;

positioning a painting sheet on the upper surface of said plate;

applying one or more drops of paint to said painting sheet;

positioning a decorated figurine that is at least in part magnetic on said painting sheet, and positioning a magnet on or near the lower surface of said plate in registration with said decorated figurine and manually moving said magnet under said lower surface such that said decorated figurine is freely moved over said painting sheet through said drops of paint and producing a desired design of said paint on said painting sheet as said decorated figurine is made to move through said drops of paint by said magnet.

14. A method as defined in claim 13 further including the step of selecting said decorated figurine from a set of different decorated figurines for positioning on said painting sheet.

* * * * *